US006280693B1

(12) United States Patent
Bauman et al.

(10) Patent No.: US 6,280,693 B1
(45) Date of Patent: *Aug. 28, 2001

(54) COMPOSITION FOR THE RECOVERY OF LITHIUM VALUES FROM BRINE AND PROCESS OF MAKING/USING SAID COMPOSITION

(75) Inventors: William C. Bauman, Midland, MI (US); John L. Burba, III, Newtown, PA (US)

(73) Assignee: FMC Corporation, Philadelphia, PA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 9 days.

This patent is subject to a terminal disclaimer.

(21) Appl. No.: 08/716,954

(22) Filed: Sep. 20, 1996

Related U.S. Application Data

(63) Continuation of application No. 08/387,178, filed on Feb. 13, 1995, now Pat. No. 5,599,516, which is a continuation-in-part of application No. 08/065,586, filed on May 24, 1993, now Pat. No. 5,389,349.

(51) Int. Cl.[7] .......................... C01D 15/00; B01J 20/00; C09K 3/00
(52) U.S. Cl. .................. 423/179.5; 423/181; 502/415; 252/184
(58) Field of Search .................. 252/184; 423/179.5, 423/181; 502/415

(56) References Cited

U.S. PATENT DOCUMENTS

| 4,116,856 | 9/1978 | Lee et al. | 252/184 |
|---|---|---|---|
| 4,116,858 | 9/1978 | Lee et al. | 252/184 |
| 4,159,311 | 6/1979 | Lee et al. | 423/179.5 |
| 4,221,767 | 9/1980 | Lee et al. | 423/179.5 |
| 4,291,001 | 9/1981 | Repsher et al. | 423/179.5 |
| 4,347,327 | 8/1982 | Lee et al. | 521/28 |
| 4,348,295 | 9/1982 | Burba, III | 252/184 |
| 4,348,296 | 9/1982 | Bauman et al. | 252/184 |
| 4,348,297 | 9/1982 | Bauman et al. | 252/184 |
| 4,376,100 | 3/1983 | Lee et al. | 423/179.5 |
| 4,381,349 | 4/1983 | Lee et al. | 521/28 |
| 4,405,595 | * 9/1983 | Yang et al. | 423/600 |
| 4,430,311 | 2/1984 | Lee et al. | 423/179.5 |
| 4,461,714 | 7/1984 | Burba, III | 252/184 |
| 4,472,362 | 9/1984 | Burba, III | 423/179.5 |
| 4,477,367 | 10/1984 | Burba, III | 252/184 |
| 4,727,167 | * 2/1988 | Burba, III et al. | 556/179 |
| 5,389,349 | 2/1995 | Bauman et al. | 423/179 |
| 5,599,516 | * 2/1997 | Bauman et al. | 423/179.5 |

OTHER PUBLICATIONS

W.C. Bauman et al "Structure and Operation of Dow's New Lithium–Selective Ion–Exchange Resin" published in 1985 by John Wiley & Sons in *Lithium—Current Applications in Science, Medicine and and Technology,* No Month.

* cited by examiner

*Primary Examiner*—Steven Bos
(74) *Attorney, Agent, or Firm*—Alston & Bird LLP

(57) ABSTRACT

The present invention is a composition comprising pellets, each of said pellets consisting essentially of an integral mass of polycrystalline material of randomly disposed crystals of hydrated alumina infused with an amount of LiX to produce $LiX/Al(OH)_3$ having up to a mol fraction of 0.33 of LiX in the so-produced $LiX/Al(OH)_3$, wherein LiX is at least one compound selected from the group consisting of Li hydroxide, Li halide, Li nitrate, Li sulfate, and Li bicarbonate. The present invention further includes methods of preparing the composition and methods of recovery lithium values from brine using the composition.

20 Claims, No Drawings

COMPOSITION FOR THE RECOVERY OF LITHIUM VALUES FROM BRINE AND PROCESS OF MAKING/USING SAID COMPOSITION

CROSS-REFERENCE TO RELATED APPLICATION

This application is a continuation of U.S. patent application Ser. No. 08/387,178, filed Feb. 13, 1995, now U.S. Pat. No. 5,599,516, which is a continuation-in-part of U.S. patent application Ser. No. 08/065,586, filed May 24, 1993, now U.S. Pat. No. 5,389,349.

FIELD OF THE INVENTION

Lithium values are recovered from lithium-containing brines as a lithium salt using altered polycrystalline hydrated alumina.

BACKGROUND OF THE INVENTION

Previous methods of extracting lithium values from brines which contain lithium are disclosed in the following U.S. Pat. Nos.: 4,116,856; 4,116,858; 4,159,311; 4,221,767; 4,291,001; 4,347,327; 4,348,295; 4,348,296; 4,348,297; 4,376,100; 4,381,349; 4,430,311; 4,461,714; 4,472,362; and 4,477,367. These patents pertain, in various ways, to creating lithium aluminates within the interstices or pores of ion exchange resins, or on other substrates, porous and non-porous. Microcrystalline lithium aluminates formed within ion exchange resins are useful in selectively removing lithium values from Li-containing brines.

Over the years, it has been found that ion exchange resin compositions were often fouled by substances in the brine, such as hydrocarbon contaminants, that rendered the ion exchange resin incapable of rejuvenation requiring re-manufacture of resin.

In *Lithium—Current Applications in Science, Medicine and Technology*, R. O. Bach Editor, published by John Wiley and Sons, 1985, there is an article on pp. 29–34, authored by W. C. Bauman, J. L. Burba, III and J. M. Lee, titled "Structure And Operation Of Dow's New Lithium-Selective Ion-Exchange Resin" containing some background information of relevance to the subject matter of this present disclosure.

We have now, unexpectedly, found it preferable to infuse LiOH into the polycrystalline hydrated alumina pellets, herein referred to as $Al(OH)_3$, by reacting it, in the presence of water, with LiOH in the absence of NaCl or other salt. We find that infusion of LiOH into $Al(OH)_3$ pellets proceeds with maintenance of pellet integrity up to and beyond 0.2 mol fraction, and up to 0.33 mol fraction of LiOH in the so-formed $LiOH/Al(OH)_3$. Furthermore, we find that having initially prepared the intercalation in the absence of NaCl or other salt, the pellets can then be converted to the LiCl form with aqueous HCl and used for the specific recovery of LiCl from brine without pellet breakage. Our prior work with intercalating LiCl directly into the crystals to form $LiCl/Al(OH)_3$ was limited to amounts of up to about 0.2 mol fraction of LiCl in order to avoid breaking up the pellets. Also, we have now determined that these so-altered polycrystalline alumina pellets containing more than 0.2 mol fraction, up to 0.33 mol fraction, of LiCl in the $LiCl/Al(OH)_3$ produced in the presently described method, offer significant improvements in costs and efficiency for recovering LiCl from brine compared to the material identified hereinabove as being of relevance in "Structure And Operation of Dow's New Lithium-Selective Ion-Exchange Resin."

SUMMARY OF THE INVENTION

This invention comprises an altered polycrystalline hydrated alumina composition, its preparation, and its use for selectively recovering lithium values from brines which contain lithium ions.

The composition comprises pellets, each of said pellets consisting essentially of an integral mass of polycrystalline hydrated alumina pellets morphologically altered by the infusion therein of LiOH (lithium hydroxide) which creates active lithium-specific sites within the crystal layers of the alumina, essentially without. decrepitation of the layered structure. The composition is prepared by adding an aqueous LiOH solution to a polycrystalline hydrated alumina (especially Gibbsite) in an amount to provide up to 0.33 mol fraction of LiOH in the polycrystalline $LiOH/Al(OH)_3$.

The so-prepared infused alumina pellets are used in the process of removing lithium values from brine by contacting it with a solution of LiX (where X is nitrate, sulfate, bicarbonate, halide, or other acid salt moiety, especially chlorine) to convert the LiOH to LiX. The resulting $LiX/Al(OH)_3$, having a mol fraction of LiX of up to 0.33, especially from above about 0.2 and up to 0.33, is a beneficial improvement in comparison with the previously attained loadings of up to about 0.2 mol fraction of LiX disclosed in our above-identified related application.

DETAILED DESCRIPTIONS INCLUDING BEST MODE CONTEMPLATED

In this disclosure the LiX of greatest interest is LiCl, and the brines of greatest interest, besides seawater, are subterranean brines, such as that from the Smackover formation which runs largely through Arkansas and into Texas.

In preparing the unique compositions of this invention, there is selected a polycrystalline hydrated alumina of pellet size which is suitable for use in a column without encountering excessive packing and blinding which interferes with efficient flow of liquids through a bed of the pellets. We find it preferable to use polycrystalline pellets of hydrated alumina known as crystalline Gibbsite, such as that which is commercially available as LaRoche H-30TM, Reynolds Metal RH-30TM, and Alcoa C-30TM. Other polycrystalline pellets can be used, such as those made from Bayerite, Norstrandite or Bauxite.

The process known as the Bayer process is used to manufacture polycrystalline hydrated alumina from various alumina-containing ores or minerals (usually bauxite) to make a coarse product which is suitable for use in this invention. Preferably the particle size of the pellets is not smaller than about 140 mesh, U.S. standard sieve size, and can be as large as about 10 mesh U.S. standard sieve size.

In general, the altered polycrystalline pellets are prepared by adding an aqueous LiOH solution to a polycrystalline hydrated alumina, herein $Al(OH)_3$, esp. Gibbsite, in an amount to provide $LiOH/Al(OH)_3$ containing, preferably, from about 0.2, up to maximum of 0.33 mol fraction of LiOH as an intercalant. This is readily done in a vessel at an ambient temperature in the range of 0° C. to 25° C. for 24 to 48 hours while adding enough pure water to keep the pellets submerged.

Preparation of pellets for use in the recovery of LiCl from brine consists in the neutralization of the $LiOH/Al(OH)_3$ pellets with dilute HCl in excess $H_2O$, preferably in the presence of $NaHCO_3$ as a buffer at pH of about 5 to 6. This neutralization step can be done at ambient temperature, and does not normally require more than a few minutes of good mixing, depending on the size of the mixing vessel. The buffer is to assure that the acidity does not become excessive.

We have determined that the present invention offers improvements in costs and efficiency for recovering lithium values from brines. The polycrystalline alumina pellets of the present invention are so inexpensive, compared with ion exchange resins, that it is more cost effective to discard spent alumina or convert it to other uses than to repeatedly rejuvenate it as an infused alumina. Also, the preparation of the lithium-capturing pellets of the present invention is relatively simple and easily managed in-situ in a vessel in which it is to be used, though it can be prepared in one vessel and then transferred to another vessel for use. A more concentrated and more pure LiX (where X is a halide ion, usually chloride) product can be obtained from the Li-containing brine, as compared to the known use of ion exchange resins.

Furthermore the present invention distinguishes over the related invention of our above cross-referenced application by not requiring an initial loading of LiX into the hydrated alumina compound in which pellet breakage was found to be encountered at loadings exceeding 0.2 mol per mol of $Al(OH)_3$.

Once the hydrated alumina has been infused with an initial amount of LiOH and neutralized with an acid to provide active LiX sites of up to 0.33 mol fraction, the LiX is washed out with water to remove much of the "loadings" of the active sites and the "unloaded" sites are efficiently used to take up more LiX from brine, and used again a plurality of times before becoming exhausted.

GENERALIZED EXAMPLE

Altered polycrystalline hydrated alumina pellets are prepared by a process comprising substantially filling the void volume of the layered polycrystalline structure, with a predetermined amount of an aqueous LiOH solution so as to have the LiOH infused ("loaded") into the polycrystalline hydrated alumina pellets in an amount to form $LiOH/Al(OH)_3$ containing more than about 0.2 mol fraction of the LiOH intercalant in the $LiOH/Al(OH)_3$ crystal structure. At 25° C. infusion of the LiOH into the crystals layers of the pellets is complete in a period of 24–48 hours. The infusion progresses into the hydrated alumina pellets with a slight swelling in particle size without fracture.

We have also found that the $LiOH/Al(OH)_3$ pellets so-formed may be suspended in water at about 25° C. and neutralized with HCl slowly in a period of 1–2 hours at 5–7 pH to produce $LiCl/Al(OH)_3$ without fracture. The alteration results in infused active sites of LiOH within layers of an appreciable amount of the crystalline layers of the hydrated alumina, but not to an extent that is enough to cause any substantial breaking apart of the polycrystalline structure The $LiOH/Al(OH)_3$ so-produced is neutralized with an aqueous acid, HCl, to convert the LiOH in the alumina crystals to LiCl to obtain a mol fraction of LiCl in the crystals of up to 0.33, preferably a mol fraction in the range of about 0.2 to 0.33. After water-washing to remove most of the infused LiCl from the alumina crystals, the "vacant" LiCl sites so-produced will accept additional LiCl from a lithium-containing brine. This "new" amount of LiCl can then be reduced in amount (unloaded) by water-washing, leaving enough of the sites to prevent collapse of the altered crystals. The "unloaded" sites are available for extracting more LiCl from LiCl-containing brines and the loading and unloading of LiCl can be done a plurality of times before the efficiency of the polycrystalline alumina becomes significantly reduced.

Example of Preparation of $LiCl/Al(OH)_3$ Pellets 156 grams of +140 mesh LaRoche H-30™ Hydrated Alumina is dry mixed with 25.2 grams $LiOH.H_2O$. The mixture is placed in a small stainless steel pot and 125 grams of distilled $H_2O$ is added. The pot is covered and held at room temperature, 21° C. for 48 hours. 125 grams of distilled $H_2O$ is added. With gentle stirring of the batch, about 110 grams of 20% HCl is slowly added over a period of about 2 hours, maintaining the pH above 3.5. The fluid supernatant contains less that 1% LiCl and has pH of 5–6. The settled volume of solids is 150 ml. The $LiCl/Al(OH)_3$ pellet bed has a mol fraction of LiCl of 0.23 and contains 4.0 mols LiCl per liter of settled (operating) bed.

Example of LiCl Recovery from Brine With $LiCl/Al(OH)_3$ Pellets 150 ml of $LiCl/Al(OH)_3$ pellets made as in above example are used in removing lithium values from a synthetic 26% NaCl brine which contains 2100 mg/liter lithium chloride. Operation is with 2 NaCl resaturation streams.

The bed is prepared by placing the $LiCl/Al(OH)_3$ pellets in a jacketed glass column 1-inch in diameter and 2 feet high with a water jacket heated to 80° C. Run water upflow at a rate to give 50% bed expansion for 30 minutes. Follow the steps below.

1.) run 1900 ml brine upflow at rate to give 50% bed expansion.
2.) allow bed to settle and drain supernatant brine to bed top.
3.) run downflow 52.5 ml 26% NaCl to displace the inter-pellet brine. The effluent is saved for recycle to step 1.) in the next cycle.
4.) run downflow 172.5 ml of of 0.76 mol/liter LiCl saturated with NaCl. The effluent is evaporated and crystallized to provide NaCl for resaturation of the two reflux streams.
5.) run downflow 90 ml of 2.0 mol/liter LiCl saturated with NaCl.
The effluent is saved for recycle to 4.) in next cycle.
6.) run downflow 52.5 ml of 0.76 mol/liter LiCl. The effluent is recycled to 5.) in next cycle.
7.) run downflow 76.5 ml of 0.76 mol/liter LiCl. 39 ml of effluent is saved as product, and 37.5 ml is resaturated with NaCl and is fed to 5.) in next cycle.
8.) run down flow 211.5 ml of water. 129 ml of effluent is fed to 6.) and 7.) in next cycle and 82.5 ml of effluent is resaturated with NaCl and is fed to 4.) in next cycle.
9.) run downflow 52.5 ml brine. Effluent is returned to water storage.
10.) run 1900 ml brine upflow at rate to give 50% bed expansion. This step 10.), the same as 1.) starts the next cycle.

Each cycle produces 0.52 mol LiCl per liter of pellet bed at a concentration of 2.0 mol/liter with the use of 1.06 liters of water.

The so-formed polycrystalline pellets are used in selectively removing lithium from lithium-containing brine in a process comprising repeated loading and unloading of the active sites, using water or water which contains some LiX for the unloading steps, and LiX-containing concentrated brine for the loading steps. The unloaded LiX is saved.

While the descriptions disclosed herein are directed primarily to recovering LiCl from NaCl brine, which is preferred and most plentiful, other metal salt brines which contain LiCl, such as. $CaCl_2$, $MgCl_2$, and KCl, can demonstrate operability in accordance with this invention. The LiCl/Al(OH)$_3$ pellets, when immersed in a chloride brine, absorb and desorb only LiCl and $H_2O$; NaCl, $MgCl_2$, $CaCl_2$, KCl, $SrCl_2$, and trace amounts of boric and silicic acids and organic matter frequently found in natural brines are excluded from the interior structure of the polycrystalline pellets. Thus a bed of LiCl/Al(OH)$_3$ pellets operating in the recovery of LiCl from brine contains only two phases: the hydrated polycrystalline LiCl/Al(OH)$_3$ phase and the inter-pellet solution phase. There is no intra-pellet solution phase containing NaCl, $CaCl_2$, etc. as exists in ion exchange resins. Hence the rinse of excess brine from a bed of LiCl/Al(OH)$_3$ pellets involves a simple displacement of the inter-pellet brine solution by water. Such a displacement may be achieved rapidly at any practical operating temperature with virtually no brine dilution and with elimination of all soluble brine components (other than LiCl) from the LiCl/Al(OH)$_3$ pellets. Comparably, the reverse step of displacing the excess water regenerant by a new cycle of brine is rapid and complete at any temperature without dilution of the brine. The displacement requires a flow of fluid of about 38% of a bed volume. Operation of 0.23 mol fraction LiCl/Al(OH)$_3$ pellets with a LiCl content of 4.0 mol/liter of bed in the recovery of LiCl from a saturated NaCl brine containing 2100 mg of LiCl per liter using NaCl resaturation and reflux produces 2.0 molar LiCl at a rate of 0.54 mol LiCl per liter of bed per cycle using 1 liter of $H_2O$ for each 13 liters of brine and 7 lbs. NaCl per 1 lb. LiCl produced The LiCl/Al(OH)$_3$ pellets produce more concentrated LiCl at a higher production rate with the use of less water than the lithium-selective ion exchange resin identified hereinabove. The polycrystalline alumina pellets of the present invention are so inexpensive, compared with ion exchange resins, that it is more cost effective to discard spent alumina or convert it to other uses than to repeatedly rejuvenate it as an infused alumina. Also, the preparation of the LiCl/Al(OH)$_3$ pellets of the present invention is relatively simple and easily managed in situ in a vessel in which it is to be used, though it can be prepared in one vessel and then transferred to another vessel for use.

One preferred manner of mixing the LiOH with the alumina is to "dry-mix" Li(OH):$H_2O$ and polycrystalline hydrated alumina pellets (e.g. LaRoche H-30 Hydrated Alumina) in the desired mol fraction ratio and add water to cover the solids and allowing this suspension to stand for 24 to 48 hours at about room temperature. This room temperature permits a more "gentle" infusion of the LiOH into the crystal layers to achieve a higher loading without causing decrepitation of the crystal layer structure. The suspension of LiOH/Al(OH)$_3$ pellets is neutralized with dil. HCl acid to 5–6 pH to form the desired LiCl/Al(OH)$_3$ pellets and then dried, if desired, before being used in recovering lithium values from lithium-containing brine. Thusly, pellets are made with a mol fraction of LiCl in LiCl/Al(OH)$_3$ greater than that in the prior invention which was limited to having not more than 0.2 mol fraction of LiCl per mol of LiCl/Al (OH)$_3$ to avoid deleterious lattice expansion of the crystal structure which can cause pellet breakage.

There are a number of brines in various places in the world which are relatively high in the concentration of LiX, especially where X represents a halogen, especially chloride. When the brine is evaporated seawater, then there is a high concentration of NaCl, with all other metal halide values being of lower concentration. Other brines often are found to have more LiX and other metal salts than found in evaporated seawater. An artificial brine can also be prepared by leaching, either roasted or unroasted spodumene, a lithium-containing mineral, with a salt solution.

Particular embodiments other than the above may be employed by others, upon learning of this invention, without departing from the inventive concept expressed in this disclosure. Our invention is limited only by the concept embodied in the claims which follow.

We claim:

1. A composition comprising pellets, each of said pellets consisting essentially of an integral mass of polycrystalline material of randomly disposed crystals of hydrated alumina infused with an amount of LiX to produce LiX/Al(OH)$_3$ having up to a mol fraction of 0.33 of LiX in the so-produced LiX/Al(OH)$_3$, wherein LiX is at least one compound selected from the group consisting of Li hydroxide, Li halide, Li nitrate, Li sulfate, and Li bicarbonate.

2. The composition of claim 1, wherein LiX is LiCl.

3. The composition of claim 1, wherein LiX is LiOH.

4. The composition of claim 1, wherein the polycrystalline material is at least one selected from the group consisting of Gibbsite, Bauxite, Nordstrandite, and Bayerite.

5. The composition of claim 1, wherein the polycrystalline material is Gibbsite.

6. The composition of claim 1, wherein the polycrystalline material is Gibbsite and LiX is selected from the group consisting of LiOH and LiCl.

7. The composition of claim 1, wherein the pellets are of a particle mesh size within the range of greater than 140 to less than 10 United States Standard Sieve Size.

8. The method of preparing the composition of claim 1, said composition comprising an integral mass of randomly disposed polycrystalline hydrated alumina pellets having LiX infused in at least an appreciable amount of the crystal layers, said method comprising:

contacting the pellets with an aqueous LiOH solution to form partially expanded hydrated alumina, LiOH/Al (OH)$_3$, having up to a 0.33 mol fraction of LiOH in the LiOH/Al(OH)$_3$, contacting the pellets with HX to convert the LiOH to LiX, wherein X represents a moiety selected from the group consisting of halide, nitrate, sulfate, and bicarbonate.

9. The method of claim 8, wherein the HX is HCl.

10. The method of claim 8, wherein the hydrated alumina is selected from the group consisting of Gibbsite, Bauxite, Nordstrandite, and Bayerite.

11. The method of claim 8, wherein the hydrated alumina is Gibbsite.

12. The method of claim 8, wherein the particle mesh size of the pellets is within the range of greater than 140 to less than 10 United States Standard Seieve Size.

13. The method of claim 8, wherein the temperature at which the infusion is carried out is in the range of not less than about 0° C. to 25° C.

14. A process for recovering Li values from brine which contains LiX, where X is selected from the group consisting of halide, nitrate, sulfate and bicarbonate, said process comprising:

(a) position in a recovery vessel a bed volume of pellets of the composition of claim 1, said pellets comprising polycrystalline hydrated aluminum containing infuse LiX in an amount of up to 0.33 mol fraction of LiX in the LiX/Al(OH)$_3$;

(b) passing LiX-containing brine through the bed of pellets until the pellets are loaded with LiX from the brine;

(c) displacing brine held-up in the bed by using concentrated NaX;

(d) unloading LiX from the pellets by flowing through the bed an aqueous solution of LiX which is not saturated;

(e) displacing the LiX from the bed using concentrated NaX and repeating the sequence of steps (b) through (e) a plurality of times.

15. The process of claim 14, wherein LiX is LiCl and NaX is NaCl.

16. The process of claim 14, wherein the concentrated NaX is saturated NaX, which is kept saturated by additional NaX.

17. The process of claim 14, the mol fraction of LiX is in the range between 0.2 and 0.33.

18. The process of claim 14, wherein the LiX-containing brine is naturally-occurring Smackover brine.

19. The process of claim 14, wherein the LiX-containing brine is synthetic brine derived by brine leaching of spodumene.

20. The process of claim 14, wherein the polycrystalline hydrated alumina is at least one obtained from the group of hydrated alumina-containing materials consisting of Gibbsite, Bauxite, Bayerite, and Nordotrandite.

* * * * *

UNITED STATES PATENT AND TRADEMARK OFFICE
CERTIFICATE OF CORRECTION

PATENT NO. : 6,280,693 B1
DATED : August 28, 2001
INVENTOR(S) : Bauman et al.

It is certified that error appears in the above-identified patent and that said Letters Patent is hereby corrected as shown below:

Column 6,
Line 52, "Seieve" should read -- Sieve --;
Line 55, after "to" insert -- about --;
Line 60, "position" should read -- positioning --;
Line 62, "aluminum" should read -- alumina --.

Column 8,
Line 11, "Nordotrandite" should read -- Nordstrandite --.

Signed and Sealed this

Thirtieth Day of April, 2002

*Attest:*

JAMES E. ROGAN
*Attesting Officer*     *Director of the United States Patent and Trademark Office*